US006556890B2

(12) United States Patent
Whaley

(10) Patent No.: US 6,556,890 B2
(45) Date of Patent: Apr. 29, 2003

(54) METHOD AND APPARATUS FOR ACQUIRING REPLACEMENT PRODUCTS FOR A PRINTING DEVICE OR ACCESSORY

(75) Inventor: Sharon Ann Whaley, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 32 days.

(21) Appl. No.: 09/896,876

(22) Filed: Jun. 29, 2001

(65) Prior Publication Data

US 2003/0004607 A1 Jan. 2, 2003

(51) Int. Cl.$^7$ ............................................... G06F 17/60
(52) U.S. Cl. ............................... 700/244; 227/2; 705/28
(58) Field of Search ......................... 705/28; 227/2; 270/58.08; 700/244, 219, 231

(56) References Cited

U.S. PATENT DOCUMENTS

| 3,685,712 A | * | 8/1972 | Turner et al. ................. 227/3 |
| 4,386,725 A | * | 6/1983 | Chambers ....................... 227/2 |
| 4,523,750 A | * | 6/1985 | Hubler .......................... 270/53 |
| 4,832,330 A | * | 5/1989 | Picton ......................... 271/236 |
| 4,905,984 A | * | 3/1990 | Haigh .......................... 271/270 |
| 5,335,048 A | * | 8/1994 | Takano et al. .............. 355/204 |
| 5,434,650 A | * | 7/1995 | Nakahara et al. ........... 355/202 |
| 5,441,191 A | * | 8/1995 | Linden ......................... 227/120 |
| 6,023,593 A | * | 2/2000 | Tomidokoro ................... 399/8 |
| 6,233,409 B1 | * | 5/2001 | Haines et al. ................. 399/10 |
| 6,328,298 B1 | * | 12/2001 | Suzuki et al. ............ 270/58.08 |
| 6,393,339 B1 | * | 5/2002 | Yeadon ....................... 700/237 |

\* cited by examiner

*Primary Examiner*—Douglas Hess

(57) ABSTRACT

A printing system includes a staple sensor that senses a low staple condition in a stapling device. A low staple message is generated in response to sensing the low staple condition in the stapling device. The printing system identifies a computing device designated to manage the replacement of staples. The low staple message is then communicated to the identified computing device. The computing device contains an application capable of determining whether replacement staples are in stock and capable of ordering more staples if replacement staples are not in stock.

22 Claims, 5 Drawing Sheets

METHOD AND APPARATUS FOR ACQUIRING REPLACEMENT PRODUCTS FOR A PRINTING DEVICE OR ACCESSORY

TECHNICAL FIELD

The invention relates to devices that handle print media, such as printers, copiers, and facsimile machines. More particularly, the invention relates to a method and system for ordering or requesting replacement products for a printing device or an accessory coupled to a printing device.

BACKGROUND

Printer technology continues to advance, resulting in commercially available printers having faster speed, increased print quality, and improved features. A wide range of printers are commercially available, ranging from relatively inexpensive "desktop" models with few features to more expensive "printing press" models that have many features and expandable options.

Many printers offer specific features that are implemented within the printer or implemented by an accessory device that is attached to the input or output of the printer. One or more of these optional accessory devices may be connected serially to perform various functions, such as binding documents, stapling documents, hole-punching documents, or depositing a document into an appropriate mailbox. Additionally, one or more of these functions may be performed within the printer itself (e.g., a printer with a built-in stapling device).

Certain features implemented within a printer or in an accessory device attached to the printer require a refillable (or replaceable) product to perform their designated function. For example, a stapling device requires a supply of staples to staple sheets of media together. Similarly, a device that glues media together requires a supply of glue and a device that binds media along an edge of the media requires a supply of the necessary binding materials used to bind the media together.

If the refillable (or replaceable) product that is required to perform a particular function is depleted, the function cannot be performed. For example, if a staple cartridge that stores staples in a printer or accessory device is empty, sheets of media cannot be stapled together until the staple cartridge is replaced with a full cartridge or refilled with staples. To avoid this condition, it would be desirable to notify a user or administrator of the printer (or accessory device) that the staple cartridge (or other refillable product) is nearly empty, thereby allowing the staples or other product to be refilled or replaced prior to depletion.

In some existing printers and accessories, no notification is provided prior to a product being depleted. In this situation, the user learns that the product is depleted when the print jobs are no longer processed using the product (e.g., print jobs are no longer stapled together). This lack of notification is wasteful if the print job must be repeated and frustrating to the user because the user must reprint the job or perform the desired function manually.

Other known printers and accessories display, for example, a "low staple" or "staple out" message on the printer's control panel. If a user doesn't notice the message on the control panel, the printer or accessory device may deplete its product and result in print jobs that are not processed as desired. Constantly checking the printer's control panel for such messages can be tedious and time-consuming, especially if users of the printer are located a significant distance from the printer.

The embodiments described herein address these and other problems using an improved method and system for acquiring replacement products for a printing device.

SUMMARY

A printing system includes a staple sensor that monitors a supply of staples in a stapling device. If the supply of staples are running low, a low staple condition is detected by the staple sensors and a low staple message is generated and communicated to an appropriate application, such as a stock management application. The stock management application then determines whether replacement staples are in stock or whether an order for additional staples is required. If replacement staples are in stock, the stock management application generates a work order to have the printing system refilled with staples.

In one embodiment, a low staple condition is sensed in a stapling device. A low staple message is generated in response to sensing the low staple condition in the stapling device. A computing device designated to manage the replacement of staples is identified. The low staple message is communicated to the computing device. The computing device contains an application that determines whether replacement staples are in stock and is capable of ordering more staples if replacement staples are not in stock.

According to one embodiment, the stapling device is located in a printer.

In another embodiment, the stapling device is located in an accessory device coupled to a printer.

In a described embodiment, the low staple message identifies the type of staples used by the printing device.

In one implementation, the low staple message identifies the location of the printer.

BRIEF DESCRIPTION OF THE DRAWINGS

The configuration methods and systems are illustrated by way of example and not limitation in the figures of the accompanying drawings. The same numbers are used throughout the figures to reference like components and/or features.

DETAILED DESCRIPTION

The embodiments described herein provide a method and system that handles the replacement of products (such as staples) in a printing device or an accessory coupled to a printing device. A staple sensor monitors a supply of staples in a stapling device. If the staples are running low, a low staple condition is detected by the system and a low staple message is generated and communicated to an appropriate device, such as a stock management device. The stock management device then determines whether replacement staples are in stock or whether an order for additional staples is required. Alternatively, the recipient of the low staple message may be presented with, for example, a link to a supplier's web site that allows a user to order replacement staples.

Figure 1:
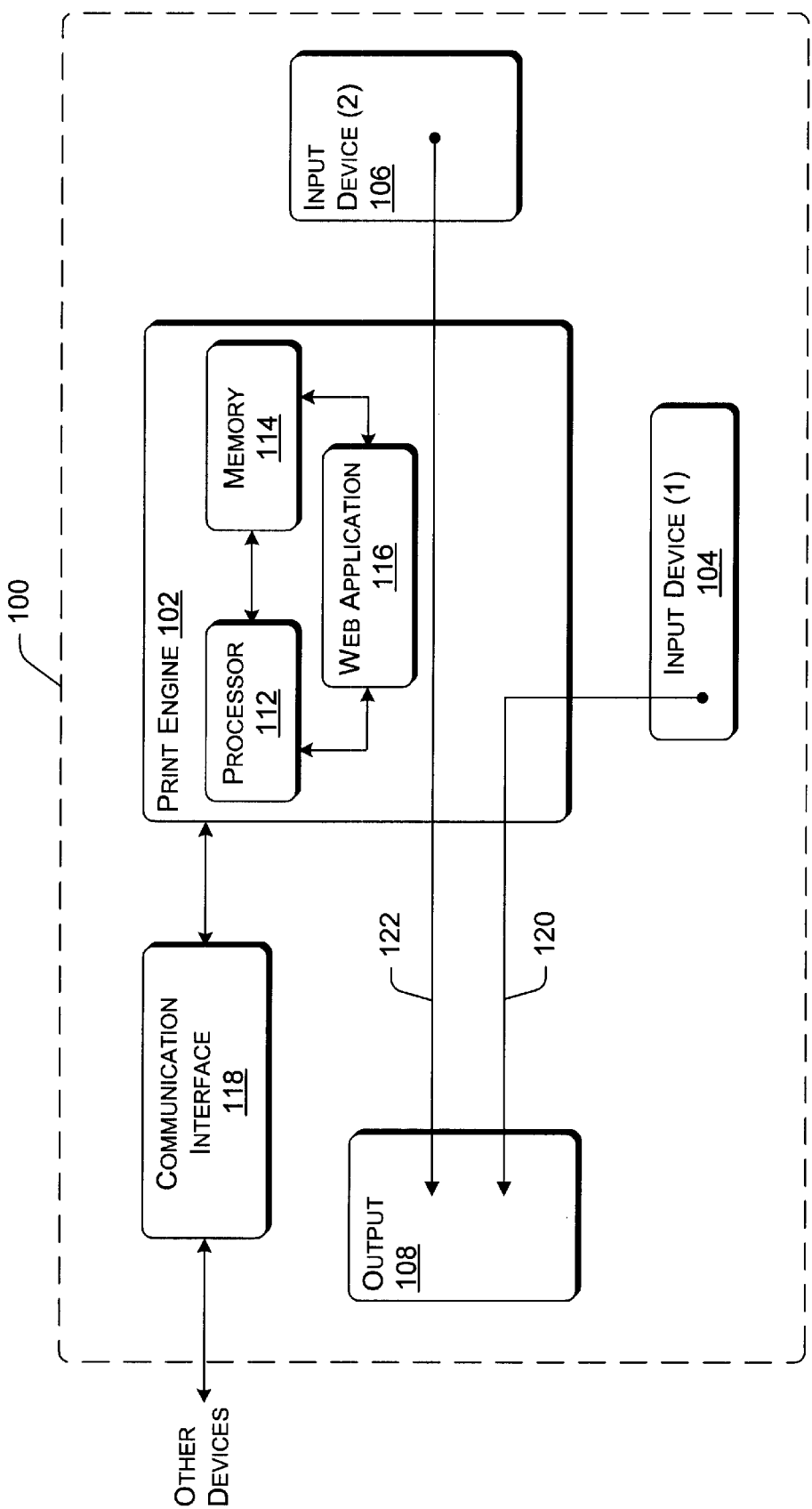
FIG. 1 illustrates various portions of an exemplary printer.

FIG. 1 is a block diagram illustrating various portions of an exemplary printer 100. As used herein, a printer refers to any type of device that can generate an image (e.g., a letter, a picture, a drawing, etc.) on any type of print media, such as paper, cardstock, plastic, or fabric. Example devices include impact printers, non-impact printers, digital copiers, analog copiers, facsimile machines, press machines, silk screen machines, etc. Printers can produce images in any of a wide variety of conventional print media (paper, plastic, fabric, etc.). However, for ease of discussion, printers are discussed herein in the context of printing on paper.

The printer 100 includes a print engine 102 and a pair of input devices 104 and 106. The printer 100 also has at least one output device 108. During a printing operation, a sheet of paper is provided to print engine 102 from one of the input devices 104 or 106, or from a direct paper feed (e.g., an external direct-feed tray). As the sheet of paper passes through the print engine 102, the appropriate information is printed on the paper. The paper can be printed in any of a wide variety of conventional manners, such as a conventional laser printing process or a conventional inkjet printing process. After printing, the sheet of paper is output directly by print engine 102 to an output 108, such as an output bin (or output tray), or other device capable of outputting the sheet of paper from the printer. The output 108 may be coupled to another device (not shown) that further processes the sheet of paper. This further processing is discussed in greater detail below.

Input devices 104 and 106 represent a variety of print medium sources and pre-processing devices. Examples of input devices 104 and 106 include: a device with one or more paper trays for supplying one or more sizes or types of paper to print engine 102; a pre-processing device to put a "stamp" on each sheet of paper prior to printing (such as physically adding a stamp to the sheet of paper or adding a graphical image or text to the information for each page); a paper separating device that separates fan-folded media into separate sheets or to cut a sheet of paper from a roll of paper; a device to affix another piece of paper to the sheet for printing (e.g., a Post-It® Note); a hole punching device to punch hole(s) in each sheet of paper; or a scanning device, such as to obtain a serial number or other identifier from a sheet of paper to verify that pre-printed media is oriented correctly for printing.

Print engine 102, input devices 104 and 106, and output 108 can communicate with one another, transferring control information and data as necessary. Such communication may occur directly between two devices, or may be routed through print engine 102. Printer 100 includes additional components, such as a print head or other mechanism for producing the data to be printed on the sheet of paper in print engine 102.

Print engine 102 includes a processor 112 and a memory/storage device 114. Processor 112 controls the transfer of paper through printer 100, including communication of information to the input devices 104 and 106, and the output device 108. Processor 112 may also communicate information to other devices coupled to printer 100. Processor 112 may be any type of microprocessor or microcontroller capable of performing the operations necessary to control the operation of printer 100. Alternatively, processor 112 may be replaced by an ASIC (application specific integrated circuit) or other customized device capable of controlling the printer 100.

Memory 114 is a volatile and/or nonvolatile memory, such as a RAM (random access memory), a ROM (read only memory), a Flash EEPROM (electronically erasable programmable read only memory), or a magnetic or optical storage device. Memory 114 stores various information generated and/or used during the operation of the printer 100. Although memory 114 is illustrated as being separate from processor 112, all or part of memory 114 may be incorporated into processor 112.

Print engine 102 also includes a web application 116, which may be stored in memory 114 or a separate storage device. Web application 116 is executed by processor 112 or another processor (not shown) in printer 100. Web application 116 allows printer 100 to communicate with other devices, such as other printers, computing devices, web servers, and the like. Printer 100 may be coupled to a network, thereby allowing other devices on the network to request information regarding the status of printer 100 via web application 116. In an alternate embodiments, web application 116 is not located in print engine 102. For example, web application 116 may be part of a separate module in the printer that includes a processor and a memory or other storage device. Additional details regarding web application 116 are provided below.

A communication interface 118 is coupled to the print engine 102 and allows the print engine to communicate with other devices, such as other printers, computers or other media processing devices (e.g., staplers, binders, or sorters) coupled to the printer 100. In a particular embodiment, communication interface 118 includes a network interface that permits communication between print engine 102 and other devices coupled to a common network. Although the communication interface 118 is illustrated in FIG. 1 as a separate component, in alternate embodiments, the communication interface 118 is integrated into the print engine 102. In a specific embodiment, two communication interfaces are provided in the printer. The first communication interface communicates with other printers and devices directly coupled to the printer. The other communication interface is a network interface that communicates via a network with other printers, computing devices, etc.

Figure 2:
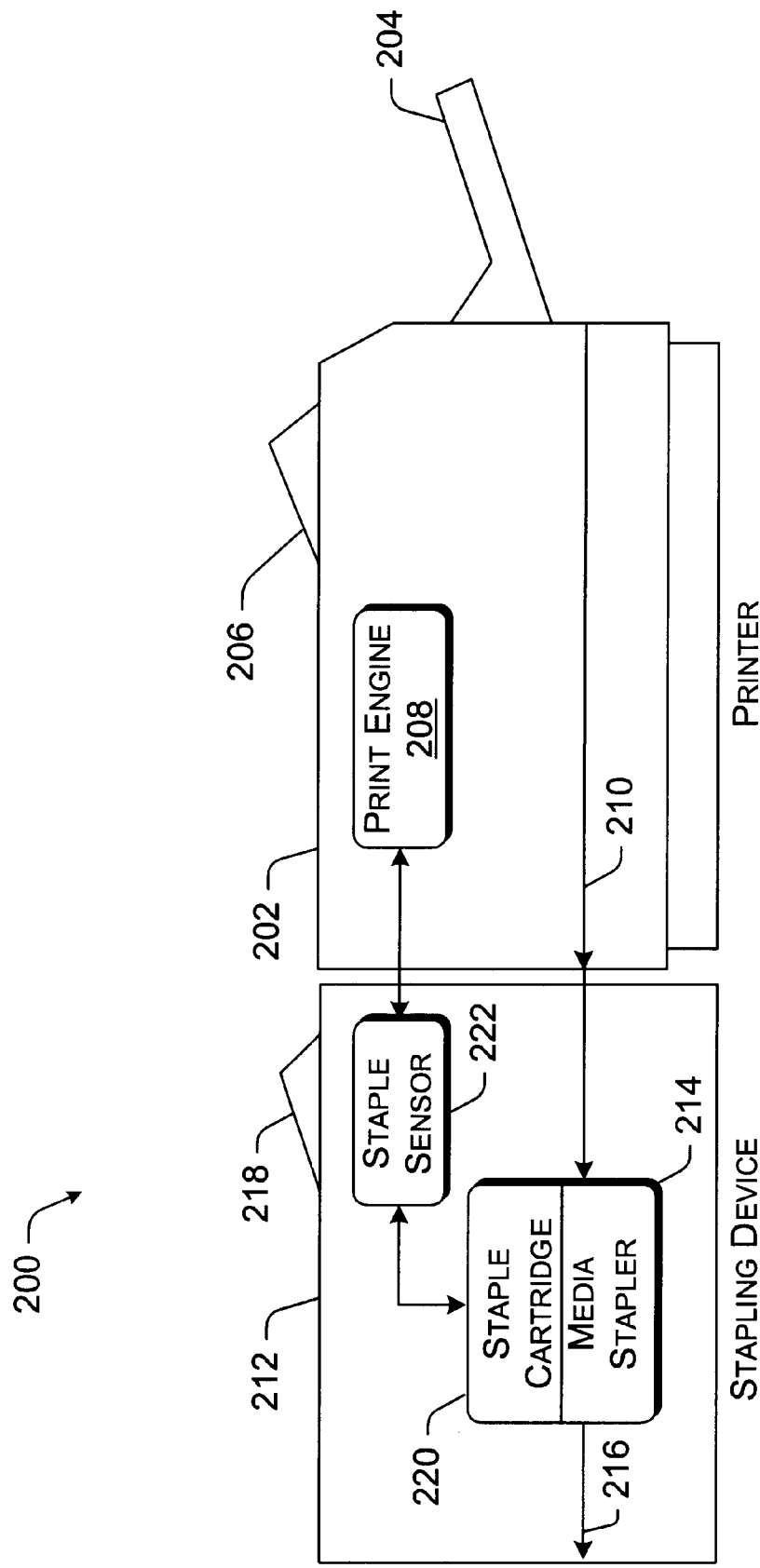
FIG. 2 is a block diagram showing a media-handling system including an exemplary printer and a stapling device coupled to the printer.

FIG. 2 is a block diagram showing a media-handling system 200 including an exemplary printer 202 and a stapling device 212 coupled to the printer. Although FIG. 2 illustrates stapling device 212 coupled to the printer 202, any type of accessory device that further processes one or more sheets of paper may also be coupled to the printer. Example accessory devices include a paper sorter; a paper folder; a hole punch; a gluing/binding device; a booklet maker to organize, fold, and bind the output as appropriate for a booklet; a device to stuff the paper into an envelope and optionally seal the envelope; a device to add job dividers such as covers or colored paper; a shrink wrap device to wrap the printed sheets; a device to add tabbed section dividers; a perforating device to perforate the printed sheets; a device to cut an arbitrary shape in the printed sheets; a laminator to laminate all or a part of a sheet (e.g., only the tabs); a mailbox device with different locations to receive printed sheets for different individuals; an embosser to emboss the printed sheets; a device to remove pieces of paper affixed to the sheet of paper for printing (e.g., Post-It® Notes); a device to affix ink from a just-printed medium to transfer onto cloth (e.g., iron onto a t-shirt); or a shredder.

Printer 202 in FIG. 2 includes an input tray 204, an output bin 206, and a print engine 208. Print engine 208 is similar to print engine 102 discussed above with respect to FIG. 1. Additionally, other input devices (not shown) may be coupled to or attached to printer 202. A paper path 210 in printer 202 shows the path of a sheet of paper through the printer to a printer output that is coupled to stapling device 212. Print engine 208 communicates with stapling device 212 to indicate whether a particular print job is to be stapled together.

Stapling device 212 receives sheets of paper from printer 202 and passes the paper through a media stapler 214, which is capable of stapling together multiple sheets of paper or other media. Media stapler 214 either staples the sheets of a print job together or allows the sheets to pass without stapling, based on the instructions received from print engine 208. The sheets are output from media stapler 214 on paper path 216. The sheets are then deposited into an output bin 218 or provided to the output of stapling device 212. The output of stapling device 212 can be coupled to another accessory device (not shown) for further processing of the printed sheets.

Stapling device 212 includes at least one staple cartridge 220 that stores multiple staples used by media stapler 214. Staple cartridge 220 represents one possible staple storage mechanism. Alternate embodiments may use any type of mechanism to store staples. A staple sensor 222 in stapling device 212 senses the number of staples remaining in staple cartridge 220 and/or senses when the staple cartridge is empty. Staple sensor 222 communicates the staple supply information to print engine 208 in printer 202. Additionally, staple sensor 222 may detect staple jams (also referred to as a staple misfeed) that prevents media stapler 214 from operating properly. A web application (e.g., web application 116 in FIG. 1) or other mechanism in print engine 208 may then communicate the printer's staple supply information to other devices. Although stapling device 212 is shown adjacent to printer 202 in FIG. 2, other accessory devices (including other stapling devices) may be positioned above or below the printer. Additionally, any number of accessory devices can be coupled to the printer simultaneously.

Figure 3:
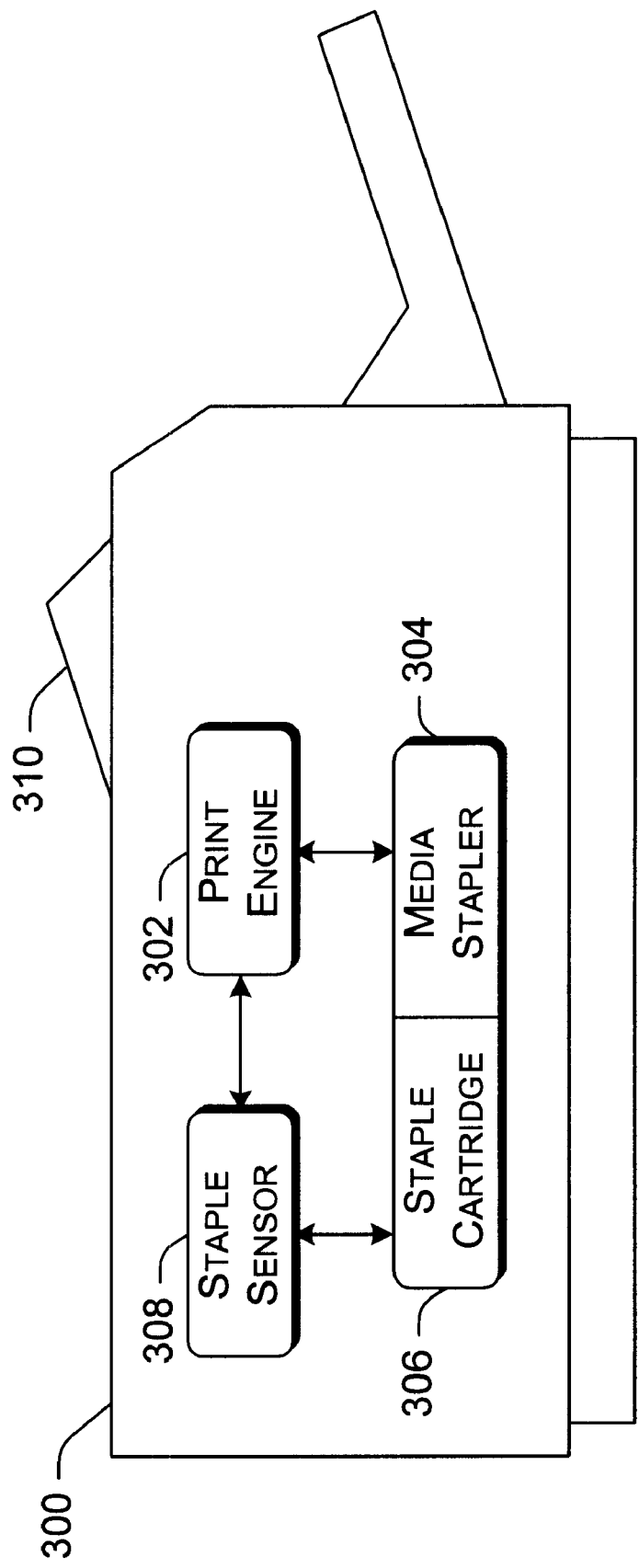
FIG. 3 illustrates an exemplary printer with a built-in stapling device.

FIG. 3 illustrates an exemplary printer 300 with a built-in stapling device. Printer 300 includes a print engine 302, which is similar to print engine 102 discussed above with respect to FIG. 1. Print engine 302 is coupled to a media stapler 304 and a staple sensor 306. Staple sensor 306 is also coupled to a staple cartridge 306, which provides staples to media stapler 304. Print engine 302 communicates with media stapler 304 to indicate whether a particular print job is to be stapled together. Printer 300 also includes an output bin 310.

As discussed above with respect to FIG. 2, staple cartridge 306 stores staples for use by media stapler 304, which is capable of stapling various types of media. Staple sensor 308 senses the number of staples remaining in staple cartridge 306 and/or senses when the cartridge is empty. Staple sensor 308 communicates the staple supply information to print engine 302 or another processing device (not shown). Staple sensor 308 may also detect staple jams that prevent the proper operation of media stapler 304. A web application (such as web application 116) or other mechanism in print engine 302 then communicates the printer's staple supply information to other devices. After processing the print job, the print job may be deposited into an output bin 310 of printer 300 or output from printer 300 to another printer or accessory device.

Figure 4:
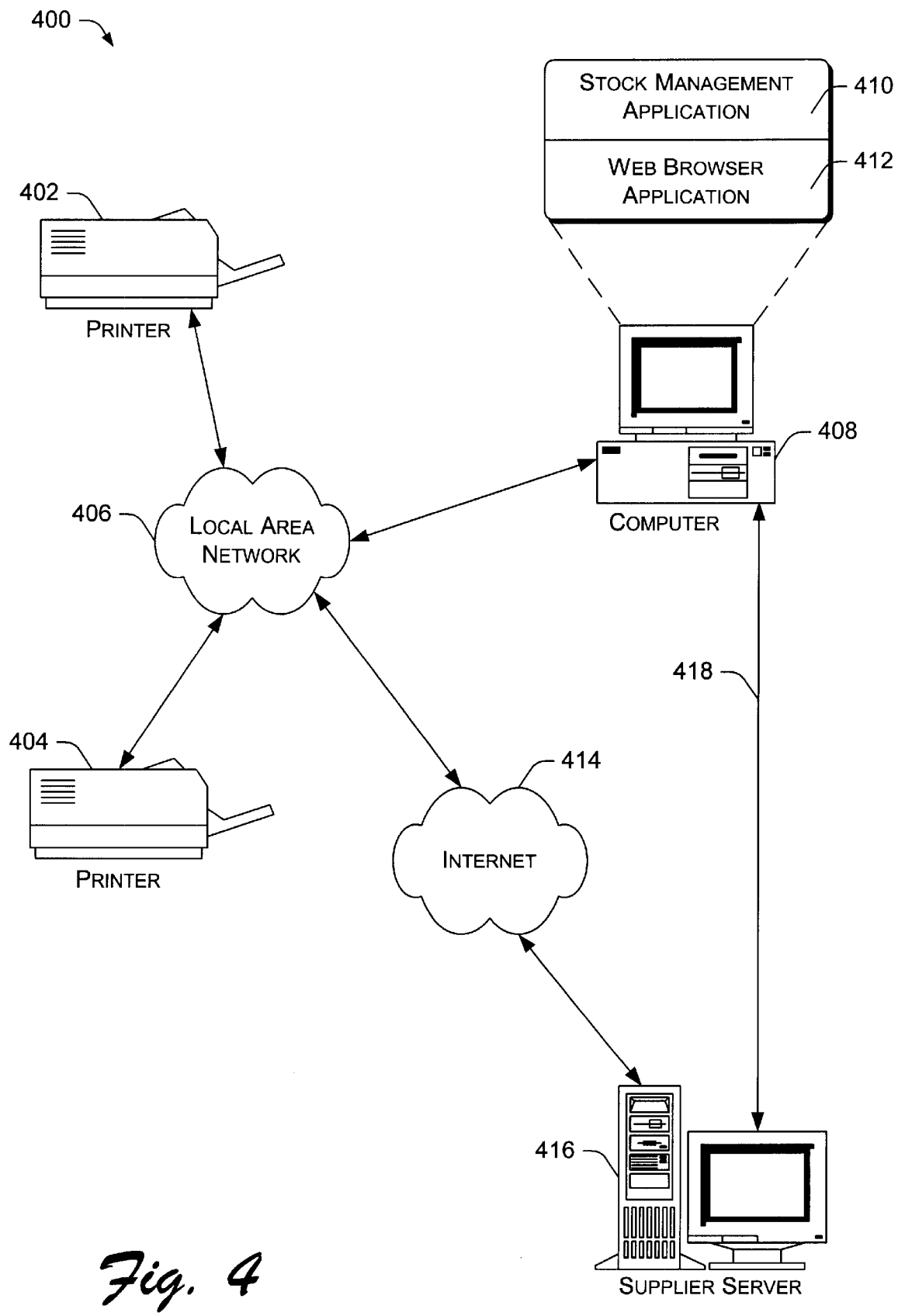
FIG. 4 illustrates an example environment in which the method and apparatus described herein may be implemented.

FIG. 4 illustrates an example environment 400 in which the method and apparatus described herein may be implemented. Printers 402 and 404 are coupled to a local area network (LAN) 406, thereby allowing the printers to communicate with other devices coupled to the LAN. In this example, printers 402 and 404 have a built-in stapling device, such as the stapling device described above with respect to FIG. 3.

A computer 408 is coupled to LAN 406 and a supplier server 416. Computer 408 is used, for example, to manage an inventory of stock items (such as paper, staples, toner cartridges, pens, paper clips, and the like). Computer 408 includes a stock management application 410 and a web browser application 412. The stock management application 410 helps the user manage the inventory of stock items. The web browser application 412 allows the user of computer 408 to access various web pages (e.g., local web pages available through LAN 406, and Internet web pages available through the Internet 414). Supplier server 416 may be a web server accessible via an internet connection 414, or a server that is accessible via a direct connection 418, such as a dial-up connection. Supplier server 416 is maintained by a supplier of stock items that are managed by stock management application 410. Thus, stock management application 410 may be used to order stock items from a supplier by communicating an order to supplier server 416.

If printer 402 or 404 are running low on staples, the printer's print engine generates a low staple message and communicates that message to computer 408 across LAN 406. Computer 408 then takes the necessary action to have the staple supply replenished. As discussed below, this action may include requesting that someone refill the staples or ordering more staples if more staples are needed.

Although FIG. 4 illustrates two printers, one computer, and one supplier server, a particular environment 400 may include any number of printers, any number of computers, and any number of supplier servers coupled together via any number of networks having any topology and using any communication protocol.

Figure 5:
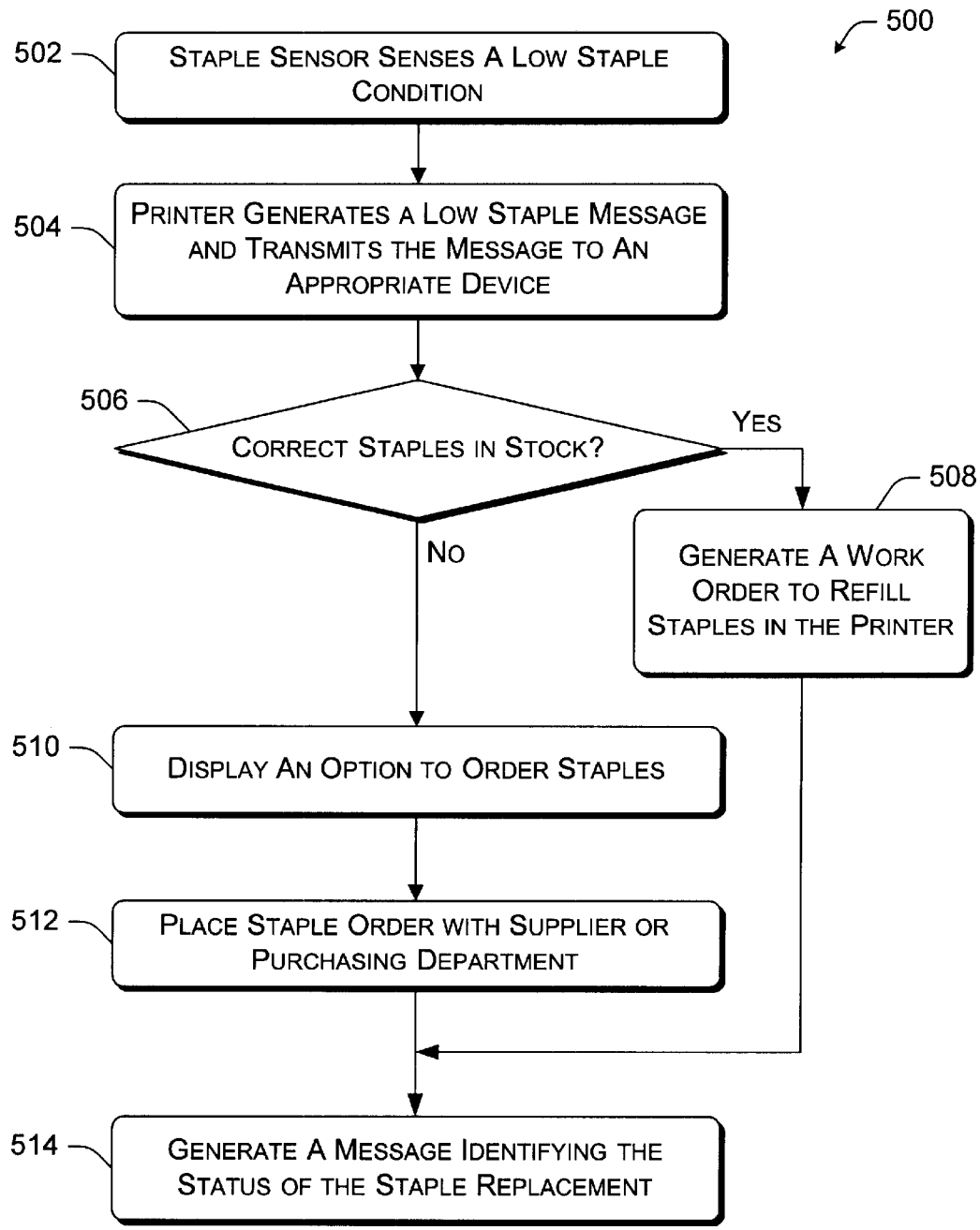
FIG. 5 is a flow diagram illustrating a procedure for detecting a low staple condition and acquiring replacement staples for a printer.

FIG. 5 is a flow diagram illustrating a procedure 500 for detecting a low staple condition and acquiring replacement staples for a printer. Initially, a staple sensor senses a low staple condition (block 502). The printer containing the staple sensor (or the printer attached to a device containing the staple sensor) generates a low staple message and transmits the message to an appropriate device (block 504). The low staple message may indicate the name of the printer or printer accessory that is low on staples, the location of the printer/printer accessory (e.g., printer 21A—second floor, outside conference room 1A), or the type of printer or type of staples required. The appropriate device may be a computer used by a system administrator or other user responsible for maintaining or managing printer operation. For example, the appropriate device may be computer 408 in FIG. 1, running a stock management application.

The procedure 500 then determines whether the correct staples are in stock (block 506). The correct staples can be identified based on the staple type included in the low staple message or based on the printer type (along with knowledge of staple types used by different printers). The current inventory can be checked, for example, using a stock management application 410, discussed above. If the correct staples are in stock, the procedure generates a work order (or other work request) to refill staples in the printer. The work order is then provided to the appropriate person or group responsible for completing the work order. Alternatively, the operator of the stock management application may refill the staples themselves without generating a work order.

If there are no replacement staples available, the procedure 500 continues to block 510, where the procedure displays an option to order staples (e.g., through a stock management application). If a user decides to order replacement staples, they may simply approve the purchase and the stock management application automatically places an order (block 512) for the appropriate staples with a supplier (e.g., using supplier server 416 in FIG. 4.) or the organization's purchasing department. Alternatively, the stock management application may collect multiple requests for stock supplies (e.g., staples, paper, and toner cartridges) and consolidate the multiple requests into a single order to the supplier. For example, the stock management application may consolidate all requests received during a day and send a single order to the supplier at the end of the day. Finally, at block 514, a message is provided to the appropriate individuals and/or systems identifying the status of the need to replace staples (e.g., staples replaced, work order generated, or staples ordered). The appropriate individuals and/or systems may include a stock manager and a stock management application.

In an alternate embodiment, additional staples are ordered from a supplier before the inventory is depleted. For example, if fulfilling a request to refill staples will bring the inventory level for that type of staple below a threshold level, additional staples are ordered, even though there are already staples in stock.

In another embodiment, a stock management application is not available for managing staples and other inventory items. In this embodiment, a low staple condition in a printer causes the generation of a low staple message that is sent to one or more designated users (i.e., the user's computer). The low staple message includes an "order staples" button (or link or similar indicator) which, when activated by the user, points the user's web browser application to a web site that allows the user to order the appropriate staples from one or more suppliers.

Thus, a system and method for acquiring replacement products for a printing device is described herein. The described embodiments allow, for example, a printer to generate a low staple message in response to sensing a low staple condition. The message is communicated to a device responsible for managing the replacement and/or ordering of replacement staples for the printing device.

Although the description above uses language that is specific to structural features and/or methodological acts, it is to be understood that the invention defined in the appended claims is not limited to the specific features or acts described. Rather, the specific features and acts are disclosed as examplary forms of implementing the invention.

What is claimed is:

1. A method comprising:
   receiving a low staple message;
   identifying a computing device designated to manage the replacement of staples; and
   communicating the low staple message to the computing device, wherein the computing device contains an application capable of determining whether replacement staples are in stock and capable of ordering more staples if replacement staples are not in stock.

2. A method as recited in claim 1 wherein the stapling device is located in a printing device.

3. A method as recited in claim 1 wherein the stapling device is located in an accessory device coupled to a printing device.

4. A method as recited in claim 1 wherein the low staple message identifies the type of staples used by the stapling device.

5. A method as recited in claim 1 wherein the stapling device is located in a printing device and the low staple message identifies the location of the printing device.

6. A method as recited in claim 1 wherein the computing device is a stock management system.

7. A method implemented by a printing device, comprising:
   receiving a low staple message associated with the particular printing device;
   determining whether replacement staples are in stock for the particular printing device;
   generating a work order to refill staples in the particular printing device if replacement staples are in stock; and
   ordering more replacement staples if replacement staples are not in stock wherein a computer readable medium is used to carry out the above steps automatically.

8. A method as recited in claim 7 wherein the low staple message identifies the type of staples used by the particular printing device.

9. A method as recited in claim 7 wherein the low staple message identifies the type of printing device.

10. A method as recited in claim 7 wherein the low staple message identifies the location of the printing device and wherein the work order includes the location of the printing device.

11. A method as recited in claim 7 wherein ordering more replacement staples includes consolidating a plurality of low staple notices into a single order for replacement staples.

12. A method as recited in claim 7 further comprising generating a message indicating a status of the staple replacement process.

13. A method as recited in claim 7 further comprising ordering more replacement staples if fulfilling the work order to refill staples will bring the inventory level for the staples below a threshold level.

14. A method comprising:
   receiving a low staple message associated with a particular printing device;
   presenting an option to order replacement staples for the particular printing device; and
   selecting the presented option if additional replacement staples are needed, wherein selecting the presented option causes a web browser application to navigate to a web page that allows a user to order replacement staples for the particular printing device.

15. A method as recited in claim 14 wherein the presented option is a link to a staple supplier web page.

16. A method as recited in claim 14 wherein the low staple message identifies the type of staples used by the particular printing device.

17. An apparatus comprising:
   a sheet binding device configured to bind a plurality of media sheets together;
   a binding sensor coupled to the sheet binding device, the binding sensor configured to detect when the sheet binding device requires additional materials; and
   a print engine coupled to the binding sensor, the print engine located in a printing device and configured to generate a low binding material message in response to detection that the sheet binding device requires additional materials by the binding sensor, the print engine further configured to communicate the low binding material message to a computing device that includes an application capable of determining whether replacement binding materials are in stock and capable of ordering more binding materials if replacement binding materials are not in stock.

18. An apparatus as recited in claim 17 wherein the print engine includes a web application configured to communicate with other devices.

19. An apparatus as recited in claim 17 wherein the sheet binding device and the binding sensor are located in a printing device.

20. An apparatus as recited in claim 17 wherein the sheet binding device and the binding sensor are located in an accessory device coupled to a printing device.

21. An apparatus as recited in claim 17 wherein the print engine includes a processor and a memory.

22. An apparatus as recited in claim 17 wherein the sheet binding device is a stapling device.

* * * * *